Figure 1:
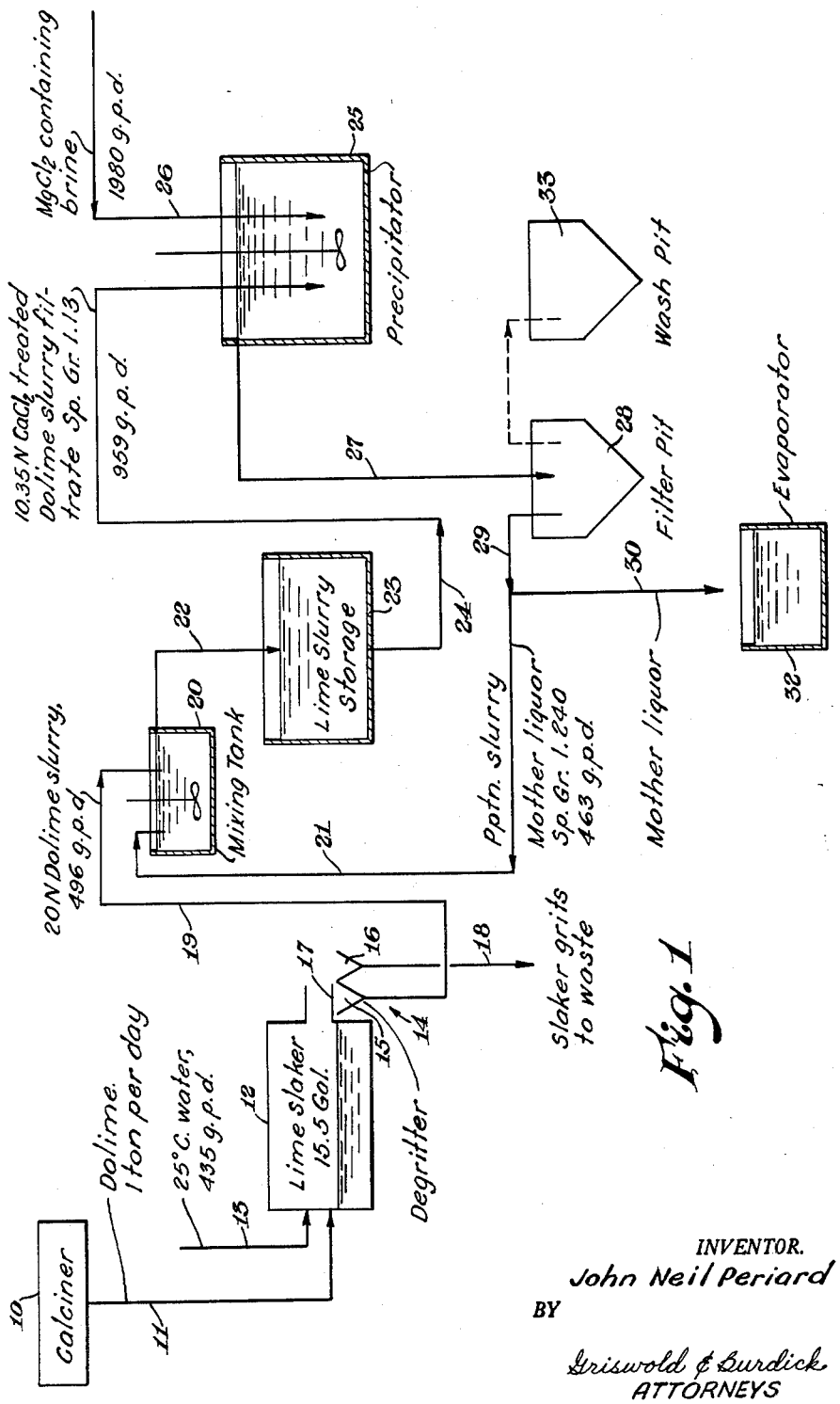

Nov. 7, 1961

J. N. PERIARD 3,007,776

PRODUCTION OF $M_G(OH)_2$

Filed Sept. 17, 1957

2 Sheets-Sheet 1

INVENTOR.
John Neil Periard
BY
Griswold & Burdick
ATTORNEYS

INVENTOR.
John Neil Periard
BY
Griswold & Burdick
ATTORNEYS

United States Patent Office 3,007,776
Patented Nov. 7, 1961

3,007,776
PRODUCTION OF Mg(OH)$_2$
John Neil Periard, Bay City, Mich., assignor to The Dow Chemical Company, Midland, Mich., a corporation of Delaware
Filed Sept. 17, 1957, Ser. No. 684,528
4 Claims. (Cl. 23—201)

The invention relates to the production of magnesium hydroxide from dolomite and a magnesium halide-containing brine.

The production of magnesium hydroxide from a magnesium halide-containing brine and dolomitic quicklime (referred to hereinafter as dolime) which is prepared by calcining dolomite, a mineral consisting of equimolar calcium carbonate and magnesium carbonate, is preferred to its production from such brine and high-calcium quicklime prepared by calcining limestone (calcium carbonate). A particularly important reason for such preference is that the yield of magnesium hydroxide from dolime and such brine is about two times that from a comparable quantity of brine reacted with high-calcium lime because the dolime is substantially as important a source of magnesium ions in the reaction as is the brine.

When dolime is admixed with water, the CaO slakes or forms Ca(OH)$_2$ at a faster rate than does MgO to form Mg(OH)$_2$. It has been observed that no Mg(OH)$_2$ can be detected when water and dolime are first intermixed at room temperature. Samples of the slaked slurry taken within about an hour show chiefly Ca(OH)$_2$ and MgO with no more than a trace of Mg(OH)$_2$. The formation of Mg(OH)$_2$ is found to occur in increasing amounts thereafter. This appears to occlude or envelop a portion of the calcium component which prevents this entrapped portion from later reacting with the magnesium halide in the brine and, therefore, some of this occluded calcium hydrate appears in the final Mg(OH)$_2$ as a contaminant. The presence of calcium in an amount of 1.5 percent, when analyzed as the percent CaO, based on the weight of MgO, renders the Mg(OH)$_2$ unacceptable for a number of uses for Mg(OH)$_2$, e.g., refractory materials.

Brines having a relatively low magnesium halide content such as ocean water may be reacted with water-slaked dolime after an appreciable aging period to produce Mg(OH)$_2$ of a satisfactorily low-calcium content but brine containing a relatively large percentage of a magnesium halide, usually MgCl$_2$, e.g., above about 2 percent, such as inland brines which may contain as high as 9 to 10 percent magnesium halides, do not produce a generally satisfactory Mg(OH)$_2$ when reacted with dolime according to methods similar to those employed with high-calcium quicklime. The present invention is, therefore, primarily directed toward the production of Mg(OH)$_2$ of improved properties from dolime and brines containing at least about 2 percent magnesium halides.

In copending application, Serial No. 684,421, filed concurrently herewith (of which applicant here is a coapplicant), there is described a novel method of producing magnesium hydroxide by water-slaking dolomitic quicklime (dolime) to prepare a dolime slurry and, within four hours, and preferably within one hour, intermixing the dolime slurry with a magnesium halide-containing brine to form an easily filtered and washed magnesium hydroxide cake of high density and low calcium content. In copending application of the present inventor and another, Serial No. 684,529, filed concurrently herewith, and now abandoned, there is described a novel method of producing an easily precipitated magnesium hydroxide cake by slaking dolime with an aqueous solution containing calcium chloride and thereafter, with no concern for urgency, reacting the calcium chloride-containing slaked dolime slurry with a magnesium halide-containing brine to form a low-calcium magnesium hydroxide cake.

The methods described in the aforesaid applications have definite advantages over methods known heretofore for the attainment of the objects of the invention, viz., the production of magnesium hydroxide precipitate having superior filterability, high magnesium hydroxide content, and low calcium content when using dolomite as a raw material. However, the method of Serial No. 684,421 has (from one viewpoint) the disadvantage of requiring prompt reaction, i.e., within four hours and preferably within one hour, of the water-slaked dolime slurry with the magnesium halide-containing brine, thereby preventing storage of the slaked lime for any appreciable time. It also has the disadvantage of resulting in a more dilute filtrate than is desirable if the filtrate is to be evaporated to recover the calcium chloride therefrom. Despite numerous advantages, the method of Serial No. 684,529, has the disadvantage of requiring the calcined dolomite used therein to be pulverized before slaking with the calcium chloride solution and, when the calcium chloride specific gravity is above 1.15, some calcium oxychloride usually forms which has a thickening effect on the stored slurry. A slurry containing calcium oxychloride tends to form a cement-like product if the slurry settles out in a tank or pipeline and also tends to coat the walls of a pipeline which is of lower temperature than the slurry when being pumped. I have now found that, by modification, the advantages of the methods disclosed in the aforesaid patent applications may be attained without the accompanying disadvantages.

It is, therefore, the principal object of the invention to provide an improved method of producing readily precipitatable magnesium hydroxide cake, of relatively low water content, which has a high percentage of magnesium hydroxide and a low contaminating calcium content without the disadvantages of (1) higher dilution of the filtrate, (2) lack of freedom to prolong the storage time between slaking and precipitation, (3) need for pulverizing the dolime, or (4) the possibility of thickening of the slaked slurry upon standing.

The method by which this and related objects are attained will be made clear in the following description and is distinctly pointed out in the appended claims.

The invention comprises calcining dolomite to form dolime, water-slaking the dolime, admixing the slaked dolime within about 2 hours at a temperature between 30° and 70° C. and preferably within 1 hour at a temperature between 30° and 95° C. with an aqueous solution of calcium chloride, and thereafter admixing the calcium chloride-treated dolime with a magnesium halide-containing brine to precipitate magnesium hydroxide which has excellent filtering properties, a relatively low water content, a high magnesium hydroxide content, and a low calcium content.

In practicing the invention the dolomite is calcined according to a conventional method. This usually consists of passing the dolomite through a brick-lined rotating kiln in which the dolomite is heated to between 1300° and 1375° C. by a blast of burning pulverized coal and gaseous hydrocarbon. The resulting oxides (dolime) are cooled and are fed, usually by means of a conveyor belt, into a slaker into which water is also fed. The slaker is equipped with a stirrer. The dolime and water are usually fed into the top of the slaker. The dolime slurry thus formed is drawn off through a side outlet. The average temperature of the slaker slurry is usually between 50° and 75° C. The normality of the alkaline slurry leaving the slaker is between 6 and 27 N.

If large grits are present in the slaker slurry, the slurry may be passed through a degritter, i.e., a filter provided with an appropriate screen. The slurry from the slaker or the degritter is directed into a mixing tank provided with a stirrer into which an aqueous solution of calcium chloride is also directed. The calcium chloride may be freshly prepared by dissolving crystalline calcium chloride in water, or it may be a portion of the calcium chloride-containing filtrate or of the precipitator suspension (comprising the suspended $Mg(OH)_2$ and suspending $CaCl_2$-containing mother liquor) produced in the process itself. The dolime slurry remains in the calcium chloride mixing tank between 5 and 30 minutes. The temperature of the calcium chloride mixing tank may be between 20° and 70° C. but it is preferred that it be between 30° and 50° C. The calcium chloride-treated dolime slurry is then run to a dolime supply or storage tank. The temperature in the supply or storage tanks should be below 50° C. and the tank should be provided with mild agitation to prevent settling.

As production needs direct, the slurry is fed from storage into a precipitator into which a magnesium halide-containing brine is fed at the same time. The precipitator is provided with an agitator which imparts sufficient turbulence to the brine and lime to adequately intermix them and hold in suspension the magnesium hydroxide being produced by the interaction of the dolime and brine. An overflow line is provided which leads the precipitator suspension i.e., the mother liquor and magnesium hydroxide suspended therein, from the precipitator to filter pits. Some of the precipitator suspension may be recycled to provide the calcium chloride in the mixing tank. From the filter pits, the precipitate is transferred to wash pits and thence to storage which is provided for the magnesium hydroxide wet cake. The filtrate is run to evaporators where the dissolved salts, principally calcium chloride, are recovered or only a major portion of the filtrate may be sent to the evaporators and a minor portion to the slaker or the calcium chloride mixing tank to be used as the calcium chloride solution for treating the slaked slurry prior to its being reacted with a magnesium halide brine in the precipitator.

The temperature of the reacting aqueous mixture is between 20° and 70° C. Best results are obtained in practicing the invention when the slaking is done at between 60° and 70° C. and the throughput of the slaker in 45 minutes to 1 hour is equal to the capacity of the slaker. Although the normality of the slaker slurry may be between 6 and 27 N, about 20 N is recommended. The slaker should be provided with a high-speed stirrer to provide turbulence.

The $CaCl_2$ solution should be admixed with the slurry from the slaker in a mixing tank very soon after the slurry leaves the slaker. The preferred time is within an hour of the beginning of the slaking operation. The $CaCl_2$ mixing tank should preferably be of a capacity equal to the volume of throughput in 5 to 10 minutes. The $CaCl_2$ mixing tank should have adequate mixing means for intermixing the contents. The recommended temperature of the storage tank is below 50° C. The tank should be provided with sufficient agitation to prevent settling. For practical purposes, the treated dolime slurry is usually conveniently stored between one and two days prior to reaction with the brine. However, dolime slurry treated according to the invention produced the same good quality, low calcium $Mg(OH)_2$ when used immediately, as well as when used after 7 and 27 days storage prior to reaction with the magnesium halide brine.

An aqueous $CaCl_2$ solution of a specific gravity between 1.08 and 1.30 may be used in the invention. However, it is recommended that the specific gravity be between 1.1 and 1.15. At greater specific gravities, some "setting up," i.e., undesirable thickening, of the treated slurry may be experienced, which is thought perhaps to be due to the formation of some oxychlorides.

Dry or crystalline $CaCl_2$ may be added to the dolime slurry from the slaker instead of an aqueous solution thereof if desired, but an aqueous solution is more convenient and requires less time for a substantially homogeneous mixture to result. Freshly made-up or stored solutions of $CaCl_2$ may be used as well as the filtrate from the filter pit or the $CaCl_2$-containing $Mg(OH)_2$ suspension from the precipitator. The last two sources of $CaCl_2$ provide valuable savings in operation.

Although Cedarville dolomite (a formation occurring in Michigan) was used in the examples which follow, dolomite from other sources may be used in a similar manner.

To ascertain the effect of aging of untreated water-slaked dolime slurry, prior to reacting it with magnesium halide brine, on the calcium content of magnesium hydroxide produced thereby, magnesium hydroxide cake was prepared from such brine and dolomite employing a conventional procedure which consisted essentially of (1) calcining the dolomite (quarried at Cedarville, Michigan) at about 1350° C. to produce dolime, (2) slaking the dolime with water under high agitation at about 90° C. to produce a 6 N dolime slurry which was run into a slurry-supply tank, (3) after one to two days' storage, intermixing the slurry as needed with brine having the analysis given below to produce magnesium hydroxide suspended in a mother liquor, (4) filtering out the magnesium hydroxide cake with Moore filter leaves and (5) washing the filtered out cake with water.

The cake produced showed an undesirably slow filtering rate and washing rate, as measured by the rate of wash water passing through a 1″ thick cake on the Moore leaves, of two gallons per minute per square foot of filter area. The percent magnesium hydroxide in the washed cake was 31 percent. The percent calcium oxide per hundred percent magnesium oxide in the cake by analysis was not less than 2.8 percent with a median value of 3.0 percent by weight.

When the magnesium hydroxide cake was prepared generally in accordance with the above conventional procedure employing dolime slurry of varying aging times, the following results were obtained.

| Dolime aging time in hours: | Percent CaO per 100 percent MgO in washed cake |
|---|---|
| 0.26 | 0.519 |
| 4.30 | 1.36 |
| 25.00 | 3.02 |

To ascertain the effect of aging of water-slaked dolime with and without the subsequent addition of aqueous calcium chloride, the following runs were made. The first runs were not according to the invention since no calcium chloride solution was added. They are designated Blanks 1 and 2 and show the effect of aging in the absence of calcium chloride addition.

The dolomite as above was that produced from the quarries at Cedarville, Michigan. The brine was a debrominated inland brine having a specific gravity of 1.27 and containing the following salts.

| Component: | Percent |
|---|---|
| $MgCl_2$ | 9.40 |
| NaCl | 2.70 |
| $CaCl_2$ | 16.70 |
| KCl | 0.97 |
| $SrCl_2$ | 0.30 |

Lesser amounts of other salts were also found to be present.

Water at about 40° C. was used for slaking which was done batchwise since the variations of the nature herein required to determine the effects of the variables was not practical in a continuous operation. The slurry temperature was maintained at between about 60° and 70° C. for 40 to 45 minutes following the slaking and prior to treatment with the calcium chloride solution. The calcium chloride solution when added was filtrate from the filter pits of a continuous plant operation employing a conventional method of the type set out hereinbefore. The specific gravity of the filtrate was 1.21 which resulted in final specific gravities of the mother liquor of the thus calcium chloride-treated slurry of between 1.03 and 1.13 dependent largely upon the quantity of calcium chloride-containing filtrate added.

The following table sets out the results of producing magnesium hydroxide, employing varying concentrations of calcium chloride solutions.

*Table*

| Sp. Gr. of Final Dolime Slurry Mother Liquor at 25° C. | Age of Dolime Slurry Before Precipitation In Days | Temperature of Dolime Slurry During aging In ° C. | cc. 1.121 Sp. Gr. CaCl$_2$ Solution Added per 500 cc. of 12 N Slurry | Normality of Final Lime Slurry | Percent CaO in 100 percent MgO in Mg(OH)$_2$ Produced |
|---|---|---|---|---|---|
| 1.00 | 0.25 | 47 | 0 | 12.0 | 0.57 |
| 1.00 | 1.00 | 30–40 | 0 | 12.0 | 3.04 |
| 1.03 | 1.00 | 49 | 72 | 10.5 | 1.41 |
| 1.08 | 0.20 | 60–70 | 270 | 7.8 | 0.67 |
| 1.08 | 1.00 | 49 | 270 | 7.8 | 0.75 |
| 1.08 | 1.00 | 65–67 | 270 | 7.8 | 1.46 |
| 1.08 | 3.00 | 49 | 270 | 7.8 | 1.17 |
| 1.13 | 1.00 | 49 | 710 | 5.0 | 0.68 |
| 1.13 | 2.00 | 49 | 710 | 5.0 | 0.73 |
| 1.13 | 1.00 | 65–67 | 710 | 5.0 | 1.13 |
| 1.13 | 4.00 | 49 | 710 | 5.0 | 0.92 |
| 1.13 | 7.00 | 49 | 710 | 5.0 | 1.09 |

Examination of the table shows the pronounced decrease in calcium content of Mg(OH)$_2$ produced when a magnesium halide-containing brine is reacted with dolime which was treated with a CaCl$_2$-containing solution prior to such reaction. For example, Mg(OH)$_2$ produced after 1 day aging at only 30–40° C. without the CaCl$_2$ treatment prior to reacting with the brine shows 3.04 percent CaO whereas that produced after 1 day aging at 49° C. following treatment with 270 cc. of the CaCl$_2$ solution showed only 0.75 percent CaO and that produced after 3 days aging at 49° C. following treatment with 270 cc. of the CaCl$_2$ solution showed only 1.17 percent CaO per 100 percent MgO.

In the annexed drawing,

FIGURE 1 is a schematic arrangement or flow sheet of the invention in a continuous process.

Figure 2:
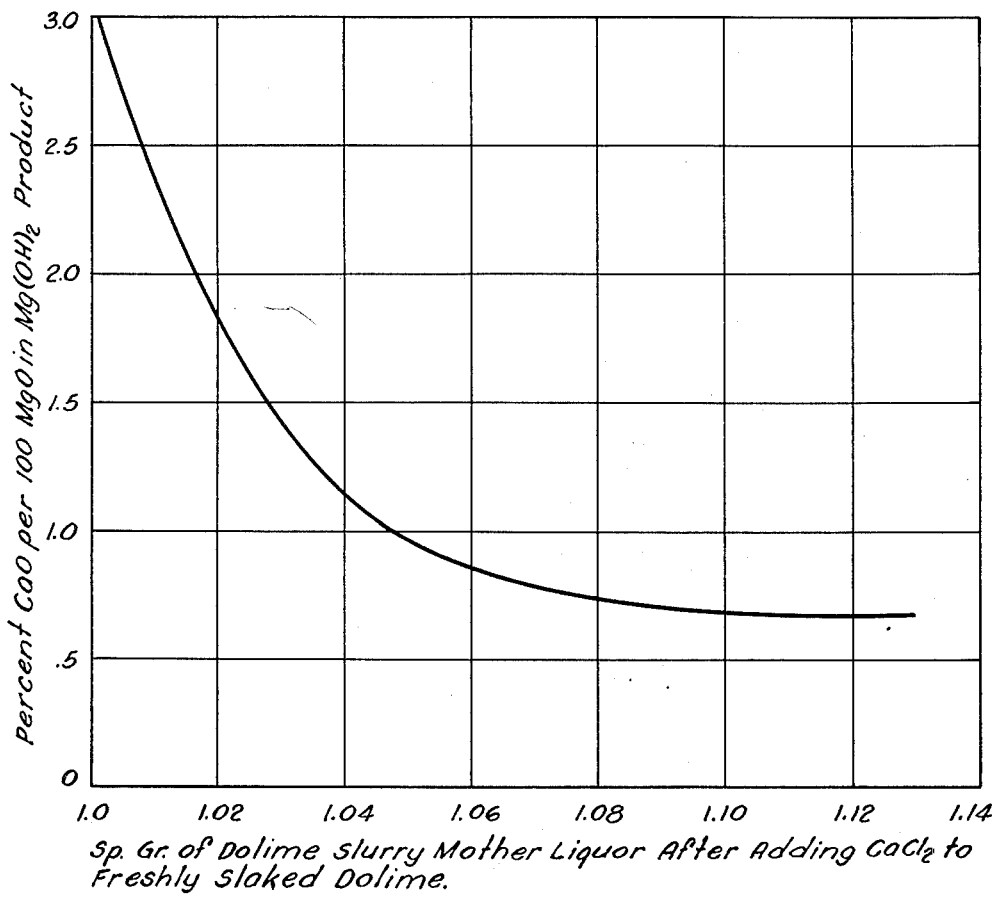

FIGURE 2 graphically shows the effect on the calcium content of magnesium hydroxide made by reacting the brine having the above analysis with portions of a day-old dolime slurry to which calcium chloride solution had been added within a period of between 40 and 45 minutes after water-slaking to give a specific gravity to the mother liquor of the slurry varying from 1.03 to 1.13. The percent calcium oxide per hundred percent magnesium oxide is plotted along the ordinate and the specific gravity of the slurry mother liquor is plotted along the abscissa.

In FIGURE 1 of the drawing, 10 is a calciner and 11 is a conveyor leading from 10 to slaker 12. Water line 13 leads from a source of water (not shown) to slaker 12. Degritter 14, positioned at the outlet of slaker 12 consists of chambers 15 and 16 and screen 17 positioned over chamber 16. Chamber 16 collects the grits and directs them through line 18 to waste. Chamber 15 collects the degritted slurry and directs it through line 19 into calcium chloride mixing tank 20. Recycle line 21 from the filter pit 28 (described below) supplies mixing tank 20 with calcium chloride solution. Outlet line 22 leads into dolime slurry storage tank 23.

As needed, dolime slurry is removed from storage tank 23 through line 24 into precipitator 25. Line 26 from a source of magnesium halide brine (not shown) continuously feeds into precipitator 25. From precipitator 25, the magnesium hydroxide in suspension overflows through line 27 into filter pit 28. The mother liquor from filter pit 28 is transferred therefrom through line 29, a portion returning through recycle line 21 to calcium chloride mixing tank 20 and the balance of the mother liquor of filtrate being conveyed through line 30 to evaporator 32. The magnesium hydroxide precipitate from filter pit 28 is transferred to wash pit 33. Wash water from wash pit 33 is run to waste.

The following example when read in reference to the drawing illustrates a mode of practicing the invention in a continuous operation.

In calculating the amounts of material in this example, the dolomite used is considered substantially all calcium carbonate and magnesium carbonate, and the calcium oxide and magnesium oxide present in the dolime is in the molar ratio of 1:1. It is also considered (based on analytical observations) that substantially all the calcium oxide hydrolyzes and substantially no magnesium oxide hydrolyzes in the slaker during the 45 minutes allowed therein. The dolime slurry desired in this example is 20 N. The specific gravity of the mother liquor of the dolime slurry leaving the slaker is 1.13.

Dolime at the rate of 1 ton per day is conveyed from calciner 10 on conveyor 11 to slaker 12 which has a capacity of 15.5 gallons. An amount of water at 25° C. sufficient to produce a 20 N dolime slurry from the slaker and to provide a flow of slurry from the slaker in 45 minutes which is equal to its capacity is pumped into slaker 12 where it is thoroughly intermixed with the dolime. The amount of water necessary is calculated as follows:

Since the dolime is equimolar CaO and MgO, the average equivalent weight of dry dolime is $$\frac{56.08 + 40.32}{2 \times 2}$$

or 24.1, and since only the CaO hydrolyzes during slaking, the average equivalent weight of the slaked dolime is $$\frac{74.10 + 40.32}{2 \times 2}$$

or 28.6. A ton of dolime would then be converted to $$\frac{28.6}{24.1} \times 2{,}000$$

or 2,370 pounds after slaking for a period of about 45 minutes. Of the 2,370 pounds, 1,535 pounds are Ca(OH)$_2$ and 835 pounds are MgO. To convert this weight to volume, $$\frac{1{,}535}{20.4} \text{ (wt./gal. Ca(OH)}_2\text{)} = \text{about 75 gallons}$$

$$\frac{835}{28.4} \text{ (wt./gal. MgO)} = \text{about 31 gallons}$$

or a total of about 106 gallons of solids after slaking.

To produce a 20 N dolime slurry, 572 grams/liter or 4.78 lb./gal. of dolime are necessary in the dolime slurry. 2,370 pounds of slaked dolime produces $$\frac{2{,}370}{4.78}$$

or 496 gallons per day of 20 N slurry. 496−106=390 gallons of free water in the dolime slurry.

$$\frac{1{,}535}{74.1} \text{ (mol. wt. Ca(OH)}_2 \times 18 \text{ (mol. wt. H}_2\text{O)}$$

= 373 pounds of water needed to slake the CaO from one ton of dolime $$\frac{373 \text{ pounds}}{8.33 \text{ (wt. of gal. of water)}}$$

= about 45 gallons of water needed per day to slake the CaO

45+390 or 435 gallons of water per day are required in all. Since there are 1,440 minutes in a day, $$\frac{1{,}440 \times 15.5 \text{ (capacity of slaker)}}{496 \text{ (daily throughput)}}$$

= 45 minutes, inventory time of the slaker

The volume of brine needed to react with the 1 ton per day of dolomite may be calculated as follows:

8.33 (wt. of a gal. of water)×1.27 (specific gravity of brine)×0.094 (fraction of $MgCl_2$ in brine)=0.995 (pound of $MgCl_2$ in a gallon of brine).

1,535 (pounds $Ca(OH)_2$ in a ton of dolime)

$$\times \frac{95.2 \text{ (mol. wt. } MgCl_2)}{74.1 \text{ (mol. wt. } Ca(OH)_2) \times 0.995}$$

= 1,980 gallons of brine per day

The volume of filtrate from filter pit 28 which is necessary to provide the $CaCl_2$ solution for mixing tank 20 may be calculated as follows:

Since the filtrate limed with 20 N dolime slurry has a specific gravity of about 1.240, the gallons of filtrate necessary to yield a $CaCl_2$-treated slurry from the slaker having a specific gravity of about 1.13 may be found as follows:

Gallons of water times its specific gravity+gallons of filtrate times its specific gravity (designated $y$)=total gallons of slurry times the specific gravity of the slurry; therefore, $390 \times 1 + 1.24y = (390+y)1.13$, or $y=463$ gallons of slurry per day.

The volume of slurry to storage would therefore be 463+496 or 959 gallons per day. Since the filtrate is substantially neutral, it would not affect the hydroxyl normality of the slurry and consequently its normality in storage would be about $$20 \times \frac{496}{960} \text{ or } 10.35 \text{ N}$$

Therefore, according to the above calculations, sufficient dolomite to produce 2,000 pounds per day of dolime is calcined at between 1,325° and 1,365° C. in calciner 10. The dolime is transferred to slaker 12 into which water is run at a rate of 435 gallons per day to produce 495 gallons per day of a 20 N dolime slurry. The dolime slurry is then passed through degritter 14 to remove objectionably large grits. The slurry is then piped to mixing tank 20 into which 1.24 specific gravity filtrate from 28 at the rate of 465 gallons per day is also run and there thoroughly intermixed for at least 10 minutes to produce 10 N $CaCl_2$-treated dolimes slurry of which the mother liquor has a specific gravity of 1.13. The treated slurry is then run to storage tank 23.

After being stored for 24 hours at about 49° C., the treated slurry from tank 23 is fed through line 24 into precipitator 25 at a rate of 959 gallons per day. Simultaneously therewith, 1,980 gallons per day of the magnesium halide-containing brine described above is run in and intermixed with the dolime slurry to produce a $Mg(OH)_2$ of improved filterability. The precipitator contents consisting of the $Mg(OH)_2$ and mother liquor overflows through line 27 to filter pit 28 equipped with Moore filter leaves which remove a large portion of the mother liquor as a filtrate. The filtrate thus drawn from the Moore filter leaves passes either to evaporator 32 or goes to make up the $CaCl_2$-containing solution which is recycled to $CaCl_2$ mixing tank 20 through line 21. The Moore filter leaves coated with adhering $Mg(OH)_2$ is transferred to wash pit 33 and there washed substantially free of remaining mother liquor to produce a $Mg(OH)_2$ cake which is then removed from the leaves.

$Mg(OH)_2$ precipitate thus produced shows improved filtration and washing properties. The washed cake is of high density (low-water content) showing not less than about 48 percent total solids and usually about 55 percent. The $Mg(OH)_2$ content of the solids in the cake is about 97 percent as determined by analyzing for the oxides of Ca, Fe, Al and Si and subtracting the total of such oxides from the $Mg(OH)_2$ product. The percentage of CaO based on the MgO is low. For example, $Mg(OH)_2$ produced as described from a $CaCl_2$-treated slurry of the invention after aging 24 hours at 49° C., analyzed only 0.68 percent CaO and that similarly produced from a $CaCl_2$-treated slurry of the invention after being aged 24 hours at between 65° and 67° C. analyzed only 1.13 percent CaO. The percent CaO in each determination is being based on the MgO.

Having described the invention, what is claimed and desired to be protected by Letters Patent is:

1. The method of producing $Mg(OH)_2$ cake having a low water content, high $Mg(OH)_2$ content, and analyzing less than 1.5 percent CaO based on the MgO by analysis, which comprises calcining dolomite to produce dolime, slaking the dolime with water in an amount sufficient to provide an excess thereof over that required to convert the CaO therein to $Ca(OH)_2$ in an aqueous slurry and to provide an alkaline normality of between 6 and 27, maintaining the slaking temperature at between 30° and 95° C., admixing the aqueous slurry thus produced within a period of two hours after the beginning of the slaking operation with $CaCl_2$ in such amount as to produce a $CaCl_2$-treated slurry of which the mother liquor has a specific gravity of between 1.10 and 1.15, admixing the $CaCl_2$-treated slurry at between 20° and 70° C. with a magnesium halide-containing brine in an amount sufficient to yield at least slightly more than the stoichiometric quantity of $Ca(OH)_2$ necessary to react with the magnesium halide in the brine to produce $Mg(OH)_2$ suspended in the spent brine aqueous suspending medium and thereafter recovering the $Mg(OH)_2$, and washing the $Mg(OH)_2$ thus recovered with water.

2. The method of claim 1 wherein the $CaCl_2$ solution is provided by dissolving $CaCl_2$ in water.

3. The method of claim 1, wherein the $CaCl_2$ solution is provided by the filtrate from the filtration of the $Mg(OH)_2$ cake.

4. The method of claim 1 wherein the $CaCl_2$ solution is provided by the $Mg(OH)_2$ suspension from the reaction of the dolime slurry and brine.

References Cited in the file of this patent

UNITED STATES PATENTS

| | | |
|---|---|---|
| 1,541,116 | Clerc | June 9, 1925 |
| 2,224,780 | Chesny | Dec. 10, 1940 |
| 2,281,477 | Chesny | Apr. 28, 1942 |
| 2,373,911 | Pike | Apr. 17, 1945 |
| 2,373,913 | Pike | Apr. 17, 1945 |
| 2,382,886 | Lee et al. | Aug. 14, 1945 |
| 2,465,264 | Pike | Mar. 22, 1949 |